Aug. 17, 1965 L. GRYK 3,201,571

RECORD READING APPARATUS

Filed Jan. 18, 1962 2 Sheets-Sheet 1

INVENTOR
LEON GRYK
BY Thomas S. Ross
Joseph R. Spalla
ATTORNEYS

Aug. 17, 1965 L. GRYK 3,201,571

RECORD READING APPARATUS

Filed Jan. 18, 1962

2 Sheets-Sheet 2

INVENTOR
LEON GRYK
BY Thomas S. Ross
Joseph R. Spalla
ATTORNEYS

United States Patent Office 3,201,571
Patented Aug. 17, 1965

3,201,571
RECORD READING APPARATUS

Leon Gryk, New Britain, Conn., assignor to Royal McBee Corporation, New York, N.Y., a corporation of New York Filed Jan. 18, 1962, Ser. No. 166,997
7 Claims. (Cl. 235—61.11)

Figure 1:
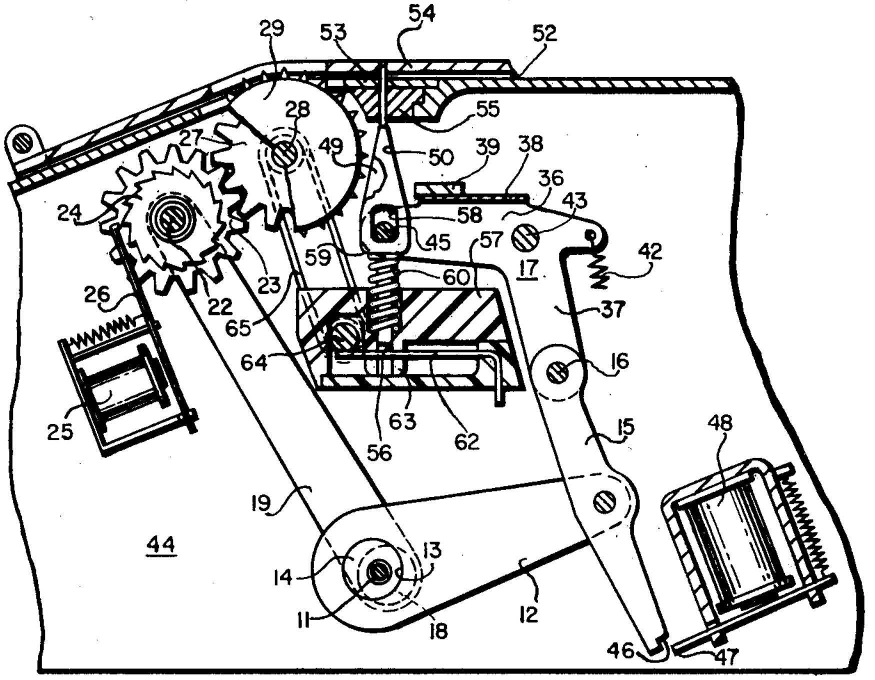

This invention relates to record reading apparatus; more particularly it relates to record reading apparatus operative in response to command signals issued by a system with which it is to function and operative in turn to emit system control signals; and specifically it relates to a free running record reading apparatus characterized by control circuitry operable in response to command signals and to signals generated internally at the free running rate to effect the processing of data.

Data processing systems presently known generally include input or source units in the form of keyboards, record readers, or computers, and output units or slaves in the form of printers, recorders, and computers, which are adapted to be selectively interconnected under control of a sequence programmer which is itself a source unit. In accordance with a proposed data processing system all of the slaves and sources are connected "on line" i.e. they are all connected to bit carrying lines common to all the units. Information placed on the lines by the programmer or program source is effective on control circuitry which in turn is effective to turn on, off, start, or stop selected ones of source and slave units and initiate a command signal. The command signal is operative on the selected source to effect the emission of data signals together with a control signal. The control signal is operative on the control circuitry to effect the generation of a start process signal which permits the slaves to process the data signals. After the slaves process the data signals they emit a signal which initiates another command signal to the source in charge. The processing of data between selected source and slave or slaves continues until the selected source emits control data which is effective on the control circuitry whereby the program source once again becomes the source in charge. In such a system only one source can be on at a time while any number of slaves can be on at a time. All sources look alike to the common lines and cannot be distinguished by the slaves they drive. Similarly all slaves look alike and cannot be distinguished from the sources driving them.

Inasmuch as the units are always "on line" logic dictates that they be capable of being "talked" to and to "talk" back to the system. In other words the units operate on a two line basis with one line telling a unit to function and the other line telling the system it is ready to function as a source or slave as briefly described hereinabove.

In accordance with the present invention there is provided record reading apparatus which operates on a two line basis. The record reading apparatus disclosed herein is of the pin sensing type having a basic operating rate but it is to be understood that any other type of record sensing apparatus could be made to operate on a two line basis in accordance with the invention. Briefly circuitry is provided, which is responsive to system command signals generated at rates up to the reader basic operating rate to effect the emission of data signals and a control signal, the latter being effective in combination with signals generated internally at the reader operating rate to operate feed control circuitry which effects the retraction of the sensing pins and effects record feed whereby subsequent data in the record may be emitted in response to subsequent command signals.

An object of the invention is to provide a record reader operable on a two line basis.

Another object of the invention is in the provision of a free running record reader operable in response to command signals generated at rates up to the free running rate.

Still another object of the invention is in the provision of a record reader operable on external command to issue data signals and control signals whereby the data signals may be processed by external apparatus.

Still another object of the invention is in the provision of a record reader having a basic read feed cycle provided with control circuitry such that the reader is automatically operable in response to interally generated timing signals and to externally generated command signals.

A further object of the invention is in the provision of a bidirectional record reading apparatus.

A still further object of the invention is in the provision of a bidirectional record reading apparatus of the pin sensing type operable to advance or reverse feed records without sensing the data therein.

Figure 2:
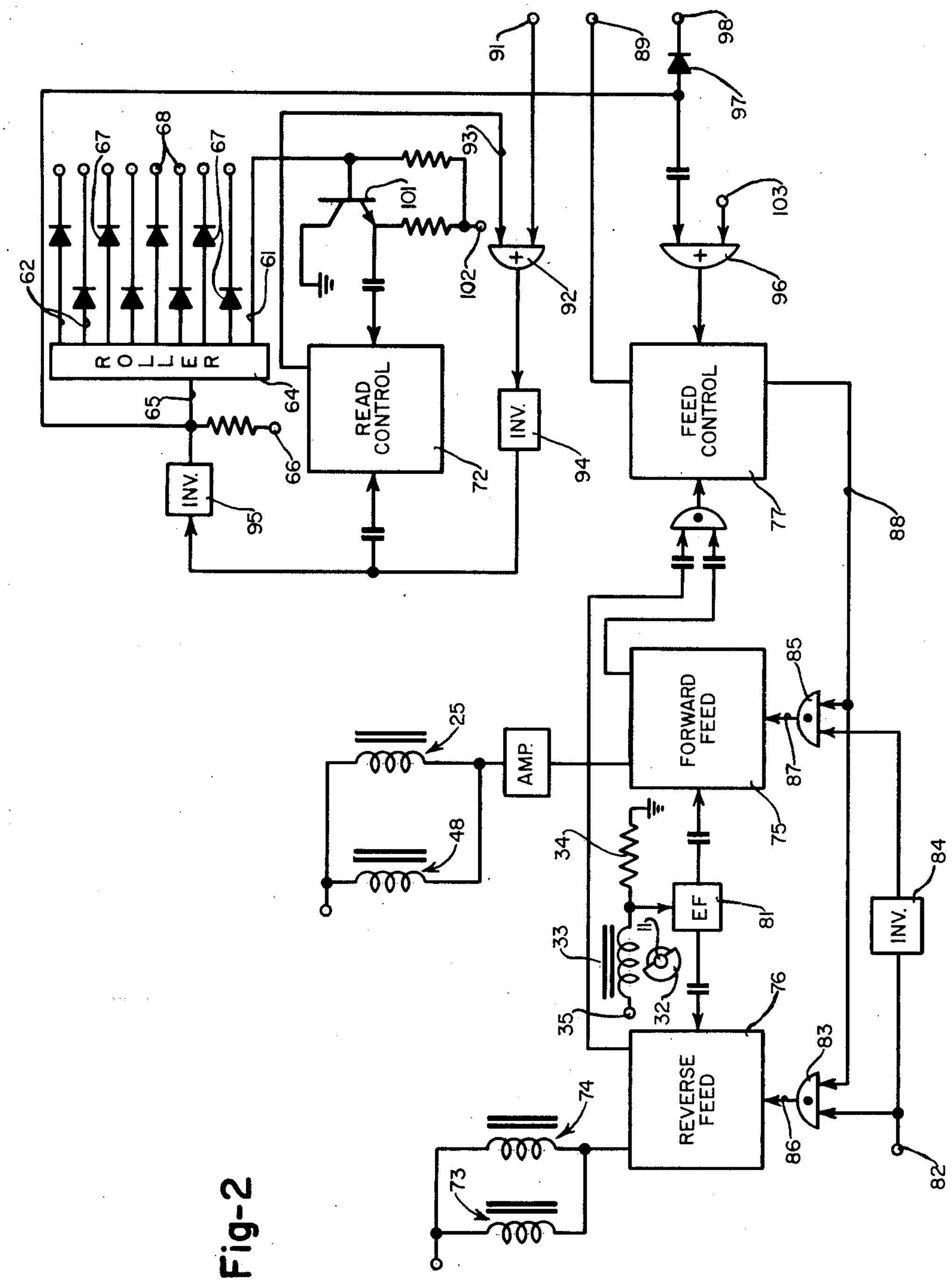

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is an elevational view of a record reading apparatus of the pin sensing type; and FIGURE 2 is a block diagrammatic view of the record sensing apparatus circuitry.

Referring now to the drawings there is shown in FIGURE 1, a shaft 11 adapted to be continuously driven from suitable motive source (not shown). A sensing pin retracting arm 12 adapted to retract the pins during forward record feed operation is provided with a circular cutout 13 adjacent one end which receives a circular cam 14 eccentrically mounted on shaft 11 whereby for each rotary cycle of shaft 11, arm 12 will be oscillated in a substantially lateral direction. The end of the drive arm 12 is articulately connected to and between the ends of a substantially vertically oriented interposer lever arm 15 the upper end of which is articulately connected to a cross shaft 16 associated with a control element generally designated by reference numeral 17.

The shaft also carries a similar cam oriented 180 degrees from cam 14 adopted to operate a retracting arm and a similarly mounted interposer lever arm whereby the sensing pins may be retracted during reverse record feed operation.

In addition the shaft carries a cam 18 associated with a feed drive arm 19 whose end is articulately connected to a stub shaft 22 which rotatably mounts a gear 23 and a forward feed ratchet 24; the ratchet being fixed relative to the gear. Associated with the ratchet 24 is a forward feed solenoid 25 and armature 26 which when interposed, as by energization of the solenoid, into the ratchet causes the ratchet and gear to rotate about the nose of armature 26 under the action of arm 19 thereby to drive a gear 27 fixed to the shaft 28 of a feed sprocket 29. When the armature is not interposed into the ratchet the ratchet and gear will idly rotate about shaft 22 and gear 23 will idly roll about gear 27. Stub shaft 22 also carries a reverse feed ratchet (not shown) which in association with a reverse feed solenoid and armature is operable by arm 19 to effect reverse feed; the timing being such that reverse feed occurs 180 degrees out of phase with forward feed as will hereinafter appear. The tape feed mechanism briefly described above is more particularly described and claimed in copending application Serial No. 36,531, now Patent 3,036,474.

The shaft 11 further carries a semicircular element 32 (FIGURE 2) operatively associated with the core of an electromagnet 33. The coil of the electromagnet is connected in series with a resistor 34 and both are connected between ground and a negative direct current source terminal 35. As is understood in the art element 32 will act to concentrate and diminish the flux in the electromagnet core every cycle of shaft 11 thereby inducing positive and negative timing pulses at the shaft rate.

Returning again to FIGURE 1 the control element 17 comprises spaced angle arms each comprising a lateral leg 36 extending toward the left as viewed in the figure and a leg 37 depending therefrom at an obtuse angle. The angle arms are connected in spaced relation by a cross piece 38 which is secured to or integrally formed with the upper edges of the laterally extending legs 36. The cross piece 21 normally abuts a clockwise motion limiting stop 39 under the influence of a spring 42 which acts in concert with springs associated with sensing pins as will hereinafter appear. The vertices of the angle arms are pivoted on a cross shaft 43 secured to the machine frame 44. The extremities of the lateral and depending legs carry a cross shaft 45 and the cross shaft 16 respectively. As stated before the lever arm 15 is articulately connected to cross shaft 16 and normally oscillates about shaft 16 in response to the oscillating drive arm 12. The lower extremity of the lever arm 15 is provided with a notch 46 which is adapted to be engaged by the armature 47 of a forward pin retracting solenoid 48 upon energization of the latter which will occur in response of negative timing pulses generated while pin retracting arm 12 is moving toward the right and feed arm 19 is moving upwardly from the position shown in FIGURE 1. With the armature 47 interposed in the path of notch 46 the initial portion of the oscillating stroke of the drive arm 12 will cause the lever arm 15 to pivot about the notch 46 and thereby cause the control element 17 to rotate counterclockwise about pivot shaft 43.

As seen in the figure identical data sensing pins 49 and a control pin 50 are supported for vertical movement into and out of a record channel 52 defined by a horizontally disposed die plate 53 and a spaced horizontally disposed record hold down plate 54. The upper extremities of the pins, which have a restricted diameter to permit their movement into code holes in a record moving through the channel 52, are guidingly received in holes in a frame supported die block 55 to which the die plate is secured; the column of holes therein aligned with the holes in the die block. The lower extremity of each pin, which is of larger diameter than its upper extremity is guidingly received in a hole 56 in an insulating block 57 secured to the machine frame 44. The intermediate portions of the sensing pins are relatively larger than the extremities and are provided with slots 58 whereby the pins may be mounted on and for movement relative to the cross shaft 45 secured between the control element legs 36. The relatively wider intermediate portions of the pins form annular shoulders 59 adapted to be engaged by the upper ends of coiled springs 60 surrounding the lower extremities of the pins. The lower ends of springs 60 are supported by annular shoulders formed in the insulating block. The normal lengths of the springs 60 are such that the pins are biased against the cross shaft 45 and into the record channel 52 as shown in FIGURE 1 which is the normal sensing position. In order to feed a record the pins must be retracted and this occurs upon counterclockwise rotation of the control element 17 under the action of arm 15 when the solenoid 48 is energized. When the pins are retracted to permit record movement the lower extremities of the sensing pins engage and depress associated spring contacts 62, which are guided in a comb 63, to cause them to break contact with a common roller contact 64 which is mounted for rotation in the insulating block and driven by a belt connection 65 to the record feed sprocket shaft 28 whereby it is incrementally rotated to present a new contact surface after each sensing operation. During the interval the pins are retracted the record will be fed columnwise by the tape feed mechanism to present the next perforation pattern in the record opposite the sensing pins. Toward the end of the feed interval with the arm 12 moving leftwardly away from interposer 15, the pins are released for movement by associated springs 60 such that those pins opposite perforations will rise and associated contracts will "make," while those pins opposite imperforate areas will be prevented from rising by the imperforate areas in the record to an extent such that their associated contacts will not "make." The force of the springs 60 associated with pins opposite perforations through engagement of the lower boundary of the slots 58 with the cross shaft 45, acts in concert with the force of the control element return spring to return the control element 17 to its normal position. The force of the springs associated with pins opposite imperforate areas coupled with the low mass of the pins is not sufficient however to perforate or tear the record. For reasons which will hereinafter appear index pin 50 similarly operates an interrogate contact 61 (FIGURE 2) which closes or "makes" later and opens or "breaks" sooner than the bit contacts 62 due to the extra length of the index pin.

Referring now to FIGURE 2 there is schematically shown the reader control circuitry including the common roller contact 64 which is always connected via a brush contact 65 to a negative source terminal 66. Also as hereinbefore noted the data contacts 62 and the interrogate contact 61 ride the surface of the common roller contact. The data brush contacts are connected via diodes 67 poled to pass positive pulses to output terminals 68. The interrogate brush contact 61 is connected as will hereinafter be more fully explained in a circuit adapted to effect the resetting of reader control flip flop 72. Also shown in FIGURE 2 are the forward pin retracting and feed magnets 48 and 25 and reverse pin retracting and feed magnets 73 and 74 controlled by associated feed flip flops 75 and 76 respectively, and a feed control flip flop 77. In the static state all of the flip flops are in a reset state.

Each of the flip flops as well as the "and" and "or" circuits are of conventional construction and preferably employ transistors. As is understood in the art a flip flop is a bistable device from which two output signal conditions, e.g. plus and minus voltage levels may be simultaneously derived, which output signal conditions reverse when the devices switch state. Switching from one stable state to the other i.e. from a reset to a set state is accomplished either by applying to one of the two inputs of such a device signals of alternating polarity or to both inputs alternately, signals of the same polarity. In accordance with the invention the forward feed flip flop 75, when not clamped in a reset state, is adapted to be set and reset by the negative and positive timing pulses generated each shaft cycle. Similarly the reverse feed flip flop 76 is adapted to be set and reset by positive and negative pulses. As shown in FIGURE 2 the pulses drive an emitter follower 81 whose output is A.C. coupled to the input terminals of the feed flip flops. When a feed flip flop is set the pin retracting and feed magnets connected to one of its outputs are energized. The other output terminals of the feed flip flops are A.C. coupled to an "or" circuit whose output is connected to one of the inputs of the feed control flip flop 77 such that when a feed flip flop is reset the feed control flip flop will also be reset.

One or the other feed flip flop 75 or 76 is clamped in a reset state by a signal on terminal 82 which is connected directly to an "or" circuit 83 and indirectly through an inverter 84 to an "or" circuit 85. The output lines 86 and 87 respectively of the "or" circuits are connected to the reverse and forward feed control flip flops whereby depending on the polarity of the signal on terminal 82 one or the other of flip flops 75 and 76 will be clamped in its reset or static state. The feed flip flops 75 and 76 are also clamped in a reset state by the signal condition on one of the feed control flip flop outputs which is connected over line 88 to the inputs of the "or" circuits 83 and 85. The other output of the feed control flip flop 77 is connected to an output terminal whereby when the feed control flip flop is set the signal on terminal 89 will indicate that the reader is in process.

The command signals from a system with which the reader is to function are applied to an input terminal 91 which is connected to an "and" circuit 92 as is a line 93 from an output of the read control flip flop 72. The polarity of the signal on line 93 when flip flop 72 is in its set state is such that the "and" circuit 92 is blocked. Since however the normal state of flip flop 72 is the reset state, the "and" circuit 92 is conditioned to pass a positive command signal on terminal 91. The control signal from the "and" gate 92 is connected to an inverter or amplifier 94 whose output is A.C. coupled to the set terminal of flip flop 72 whereby the positive going trailing edge of the inverted control signal will set flip flop 72. The output of amplifier 94 is also connected directly to an inverter or amplifier 95 wherein it is reinverted and applied to the common brush contact 65 thereby overcoming the bias of source 66 on the diodes 67 associated with data brush contacts corresponding to pins extending through perforations in a tape or record being read and for as long as the signal on terminal 91 obtains.

The control signal from the inverter 95 is also A.C. coupled to one of the inputs of an "or" circuit 96 having its output connected to the set input of the feed control flip flop 77 whereby the leading edge of the control signal will set flip flop 77. Also the control signal from inverter 95 is connected via a properly poled diode 97 to an output terminal 98. The control signal on terminal 98 effects, as hereinbefore stated, the generation of a start process signal which tells a slave to process the data on terminals 68 and which is operative on the control circuitry to terminate the command signal issuing therefrom. After the processing of the data the slave will issue a process complete signal which effects the generation of another command signal. The subsequently generated command signal on terminal 91 will persist until a control signal on terminal 98 resulting from passage of the command signal through "and" gate 92 effects the generation of another start process signal. As shown the interrogate contact 61 is connected to the base of an NPN transistor emitter follower 101 whose output is A.C. coupled to the reset terminal of flip flop 72. The emitter and base are resistively coupled to a source 102 which is more negative than source 66 for reasons which will hereinafter be apparent.

In operation then, with all the flip flops in a reset state and the pins biased toward a record in channel 52, those pins opposite perforations in the record will extend through the perforations, and associated contacts will be closed. The application of a command signal on terminal 91 will cause a control signal to issue from "and" gate 92 which will effect the energization of the data terminals 68 associated with pins in perforations, and the energization of terminal 98 for as long as the command signal is present. Also the leading edge of the control signal will set the feed control flip flop 77 whereby its clamping voltage will be removed from the feed flip flops 75 and 76 such that the one not clamped by the signal on terminal 82, e.g. the forward feed flip flop 75, will no longer be clamped in the reset state. In this unclamped state the application of a negative set pulse from emitter follower 81 to the set-reset terminal of flip flop 75, assuming that it is generated coincident with the setting of flip flop 77 or after flip flop 77 has been set by the control signal, will switch flip flop 75 to its set state and effect the energization of the pin retracting and forward feed magnets 25 and 48 whereby a record may be indexed in the shaft cycle during which the set pulse is generated and in subsequent cycles.

If a set pulse occurs before flip flop 77 is set, flip flop 75 cannot be set until another set pulse is generated. Hence no feeding will occur in the cycle during which the command signal was applied. The control signal from "and" gate 92 will however energize terminals 68 and 98, the signal on terminal 98 generating a start process signal to permit a slave to process and whereby the data will be processed; the start process signal also effecting the termination of the command signal whereby the read control flip flop will be set by the trailing edge thereof. A subsequent command signal applied to terminal 91 as a result of a process complete signal will not pass "and" gate 92 until flip flop 72 is reset by a reclosure of the interrogate contact 61. The latter occurs after the record has been fed, record feed being initiated by the set pulse generated in the next following shaft cycle. Since the subsequent command signal persists on terminal 91 until gate 92 permits it to pass and the resulting control signal on terminal 98 has generated a start process signal, the resulting control signal will cause the flip flop 77, set in the first cycle and reset in the second, to be set in the third cycle before the generation of a third set pulse, whereby record feeding can occur in the third and subsequent cycles. In other words, the signal on terminal 91 will now be synchronized with the machine cycle. When synchronized, feeding will occur after the termination of the control signal such that flip flop 72 will have been set by the trailing edge thereof.

As will be appreciated from the above if the processing of the data on terminals 68 by a slave occurs at a rate equal or faster than that of the free running rate, the command signals applied to terminal 91 will continue to be synchronized with the shaft cycle; but where the operating rate of a slave is less than the reader operating rate, command signals will not necessarily occur synchronously with the shaft cycle. Where the operating rate of the slave is equal to that of the reader operating rate, after synchronization of the command signal and shaft cycle occurs as above, processing will occur at the command rate.

It is to be here noted that prior to the setting of the read flip flop 72 the application of the positive control signal to the interrogate contact has no effect on flip flop 72 as it is then in its reset state. The termination of the control signal will cause the interrogate contact to assume the negative potential of source 66 but since this will coincide with the setting of flip flop 72, the negative signal will have no switching effect. When after the tape has been indexed and the pins rise to sense the new perforation pattern, the interrogate contact remakes and the reapplication of the negative source 66 to the base of the emitter follower will cause it to swing positive by the difference between sources 66 and 102. The resulting positive going pulse will reset the read control flip flop 72 thereby opening the "and" gate 92 to permit the passage of another command signal and thereby another read-feed cycle.

A reverse read-feed cycle operates as above except that the polarity of the signal on terminal 82 is reversed and the reverse flip flop is set and reset by the positive and negative timing pulses such that synchronization to the mechanical cycle is 180 degrees removed from what it was during forward feed.

Similarly record movement (forward or reverse) without reading may be accomplished simply by applying a signal to a terminal 103 connected to the "or" circuit 96 which will set the feed control flip flop.

It should be understood that the foregoing disclosure relates to only a preferred embodiment of the invention and that it is intended to cover all changes and modifications of the example of the invention herein chosen for purposes of the disclosure which do not constitute departures from the spirit and scope of the invention.

The invention claimed is:

1. Apparatus for reading records having data items recorded therein in columns transverse the direction of movement of said records,
   means for sensing said data items in response to a control signal,
   means for feeding said record after a sensing interval,
   a continuously operable shaft,
   means for generating pulses at said shaft rate,
   and means responsive to said control signals and to said shaft generated pulses for operatively connecting and disconnecting said shaft to said record feeding means during a shaft cycle.

2. Apparatus for reading records having data items represented by perforation patterns recorded therein in columns transverse the direction of movement of said records,
   a common contact adapted to be energized in response to a control signal,
   a plurality of output terminals adapted to be connected and disconnected to said common contact in accordance with the perforation patterns in said record,
   record feed means,
   a cyclically operable shaft,
   means for generating pulses at the shaft rate,
   electromagnet means adapted when energized to effect the connection of said shaft to said record feed means,
   means for applying said control signals to said common contact,
   and means responsive to said control signals and to said pulses for energizing and de-energizing said electromagnet means during a shaft cycle.

3. Apparatus for reading records having data items represented by perforation patterns recorded therein in columns transverse the direction of movement of said records,
   means for sensing said perforation patterns in response to a control signal,
   record feed means,
   a cyclically operable shaft,
   means for generating pulses at the shaft rate,
   electromagnet means adapted when energized to effect the connection of said shaft to said record feed means,
   feed control means conditionable in response to said control signals,
   means for applying said control signals to said sensing means and to said feed control means,
   said conditioned feed control means being operative in response to said pulses for energizing and de-energizing said electromagnet means during a cycle of said shaft whereby said record is incrementally fed after a sensing interval.

4. Apparatus for reading records having data items represented by perforation patterns recorded therein in columns transverse the direction of movement of said records,
   a common contact adapted to be energized in response to a control signal,
   pattern sensing means,
   a plurality of output contacts operable by said sensing means and adapted to be connected and disconnected to said common contact in accordance with the perforation patterns in said record,
   record feed means,
   a cyclically operable shaft,
   means for generating pulses at the shaft rate,
   means adapted when conditioned to effect during a shaft cycle the connection and disconnection of said shaft to record feed means in response to said pulses, feed control means operative in response to said control signals for conditioning said last named means,
   and means for applying control signals to said common contact and to said feed control means.

5. Apparatus for reading records having data items represented by perforation patterns recorded therein in columns transverse the direction of movement of said records,
   pattern sensing means,
   a common contact,
   a plurality of output contacts operable by said pattern sensing means and adapted to be connected and disconnected to said common contact in accordance with the perforation patterns in said record,
   record feed means,
   a cyclically operable shaft,
   means for generating pulses at the shaft rate,
   means adapted when conditioned to effect the connection of said shaft to said record feed means in response to said pulses and to effect the disconnection thereof later in a shaft cycle,
   feed control means responsive to control signals generated in response to command signals for conditioning said last named means,
   gate means for passing said command signals whereby control signals are generated and applied to said common contact and to said feed control means,
   and means operative by said control signal for blocking said gate means over a record feed interval.

6. Apparatus for reading records having data items represented by perforation patterns recorded therein in columns transverse the direction of movement of said records,
   pattern sensing means,
   a common contact,
   a plurality of output contacts operable by said pattern sensing means and adapted to be connected and disconnected to said common contact in accordance with the perforation pattern sensed,
   a cyclically operable shaft,
   record feed means,
   electromagnet means adapted when energized to effect the connection of said shaft to said feed means,
   flip flop means adapted when set to energize said electromagnet means,
   means for generating set and reset pulses at said shaft rate for setting and resetting said flip flop,
   feed control means for conditioning said flip flop to respond to said pulses,
   gate means adapted to pass periodically applied command signals to said common contact and to said feed control means,
   read control means responsive to gated command signals for blocking said command signals during a feed interval,
   and means responsive to the termination of record feed operative on said last named means theerby to unblock said gate means after a feed interval.

7. Apparatus for reading records having data items recorded therein in columns transverse the direction of movement of said records,
   means for sensing said data items in response to periodically applied control signals,
   means for incrementally feeding said record after a sensing interval,
   a continuously running shaft operable at a rate greater than or equal to the rate of applied control signals,
   means for generating set and reset pulses each shaft cycle,
   conditionable bistable means operative in response to set pulses to another than normal state to effect the connection of said shaft to said record feeding means and operative to its normal state in response to reset pulses thereby to effect the disconnection of said shaft and record feeding means, bistable control means operative to its other than normal state in response to said control signals for conditioning and for maintaining conditioned said conditionable bistable means and operative to its normal state simultaneously with the return of said conditionable bistable means to its normal state, and means for delaying a subsequent control signal over the interval said bistable control means is in its other than normal state.

No references cited.

MALCOLM A. MORRISON, *Primary Examiner.*

DARYL W. COOK, *Examiner.*